United States Patent Office 3,456,765
Patented July 22, 1969

1

3,456,765
FIXED-YOKE DISK BRAKE
Ernst Meier, Frankfurt am Main-Sindlingen, Germany, assignor to Alfred Teves GmbH, Frankfurt am Main, Germany, a corporation of Germany
Continuation-in-part of application Ser. No. 680,831, Nov. 6, 1967. This application Jan. 11, 1968, Ser. No. 697,147
Claims priority, application Germany, Jan. 13, 1967, T 32,974
Int. Cl. F16d 65/14, 55/00; 65/38
U.S. Cl. 188—106
10 Claims

ABSTRACT OF THE DISCLOSURE

A fixed-yoke disk brake having a pair of wheel-brake cylinders urging respective brakeshoes against opposite faces of the disk in respective halves of the yoke, and a mechanical actuating system (e.g. for emergency or hand brake) which has a pin acting upon one of the main brakeshoes while the reaction force draws the yoke or urges the disk into contact with an auxiliary brakeshoe fixed on the the other yoke half by the deflection of the yoke and/or the disk.

---

This application is a continuation-in-part of application Ser. No. 680,831 filed Nov. 6, 1967, now U.S. Patent No. 3,424,282 of Jan. 28, 1969.

My present invention relates to a fixed-type yoke disk brake and, more particularly, to a disk brake having both hydraulic and mechanical actuating means.

A disk brake is generally considered to comprise a yoke or brake support affixed to an axle housing of a vehicle wheel assembly or to another portion of the vehicle body in which a pair of brakeshoes are axially displaceable for engagement with a rotatable brake disk flanked by the brakeshoes. The brake disk, which may be affixed to the tire-carrying wheel disk or the wheel shaft, is provided with a pair of annular braking faces along opposite surfaces of the disk, each of these braking faces being engageable by a respective brakeshoe when the wheel brake is applied. The yoke extends around th periphery of the disk over only a segment of its circumference and may be provided with one or more hydraulic cylinders receiving fluid from the master cylinder of the hydraulic brake system to urge the brakeshoes against the annular braking faces of the disk and thereby frictionally reduce the speed of the latter relative to the housing. In addition, a parking, locking, or emergency brake-actuating mechanism may be provided for brake operation by the driver of the vehicle from a position adjacent the driver's seat. Such devices, commonly known as "handbrakes" even though they may be operated in the alternative by hand or foot, may comprise a mechanical link between the actuating lever and one or both of the brakeshoes. Such devices may be operated by the driver upon parking to retain the vehicle against movement, or may be applied when the vehicle is in motion to supplement or augment the hydraulic braking action, etc.

In the copending application referred to above, I have described and claimed a disk-like brake dual-network hydraulic systems in which a housing member extending around the periphery of the brake-disk member carries a pair of actuating cylinders adapted to apply respective brakeshoes frictionally against the disk. Flanking the brakeshoes, the housing member carries pairs of stationary anvil pads having frictional linings similar to those constituting the brakeshoes and operatively associated with the brakeshoes of the opposite side of the disk but symmetrically offset outwardly therefrom relative to an axial plane of the disk through the axis of the actuating cylinder. The system comprises a main brakeshoe axially shiftable in the housing on one side of the disk and adapted to bear upon a corresponding braking face, while a pair of anvil members engage the other braking face of the disk (i.e. on its obverse side), upon failure of the hydraulic network supplying the actuating cylinder for the main brakeshoe on that side. Since the pads are provided in association with the brakeshoes and become effective only when the main brakeshoes are rendered inoperative or have insufficient stroke, they function as anvils taking up the pressure which is applied to the brake disk by the operative brakeshoe. The pad on each side of the brake may be set back from the main brakeshoe surface at this side by a distance from the disk which exceeds the normal play of the brake, thereby requiring the operative main brakeshoe on the other side of the disk to generate a greater stroke than would be necessary for normal brake application before the operative main shoe engages its face of the disk and draws the other face of the disk into contact with the anvil pads. Thus, upon failure of one of the fluid-transmission systems, the other transmission system nevertheless remains effective, albeit with increased stroke, to apply the brake with substantially undiminished braking effectiveness assuming that the braking faces, insofar as the surface area, texture and frictional coefficient are concerned, of both pairs have essentially the same effective characteristics as the inoperative brakeshoe disposed therebetween. In this manner, even if a failure of one of the transmission networks occurs, wheel braking effectiveness is applied at the wheel axle and a full utilization of the vehicle weight in the braking operation is ensured.

Disk brakes have been provided heretofore wherein the hydraulic means is effective upon both brakeshoes in a uniform manner and the actuating force of the mechanism or handbrake is similarly effective upon the same brakeshoes. For the most part, conventional disk brakes of this type provide a mechanical brake-actuating system which is arranged on only one side of the brake disk and, therefore, on only one half of the brake support. To ensure uniform application of the brakeshoes to the opposing faces of the disk, the brake yoke may be mounted on the vehicle chassis or axle support with at least limited mobility in the direction of these braking faces so that the yoke, in effect, floats and, as one brakeshoe is applied directly by the wheel-brake piston and the mechanical actuating means against the near side of the disk, the reaction force on the cylinder and the actuating levers is transmitted by movement of the yoke to draw the other brakeshoe against the far side of the disk. When mounting complications or the like preclude the use of floating-yoke brakes, it is common practice to make use of fixed-yoke brake supports having a pair of wheel-brake cylinders in the respective yoke halves and a scissor-type of toggle linkage for simultaneously applying the ordinary and emergency braking forces to both brakeshoes. It is evident that such systems are much more complex than floating-yoke arrangements and, therefore, open the door to breakdown from a variety of causes.

It is, therefore, the principal object of the present invention to provide a fixed-yoke disk brake in which the aforementioned disadvantages are avoided.

A more specific object of this invention is to provide a disk brake of simplified construction, minimum number of operating parts, little tendency toward breakage and low construction costs.

I have found that it is possible to attain these objects and to extend the principles originally set forth in the aforementioned copending application by providing a fixed-yoke disk brake in which first and second main brakeshoes are mounted in respective yoke halves and are juxtaposed with the braking surfaces of the disk member for movement toward the latter upon application of hydraulic pressure to the wheel-brake cylinders associated with these brakeshoes, the mechanical brake-actuating means including an incompressible force-transmitting element slidable in the first yoke half, along the inner side of the disk, upon actuation of a lever delivering reaction force to the yoke member; the element, which may be a rod, pin or stud, engages the first main brakeshoe at a location along its backing plate beyond the respective piston and thus applies this brakeshoe to the disk independently of the hydraulic-actuating means. The other yoke half is provided, adjacent the second main brakeshoe or pad which is brought into engagement with the obverse side of the disk solely by the deflection of either the brake half, the disk or both. Thus, while the system functions as a conventional fixed-yoke brake upon hydraulic actuation, it functions substantially as a floating yoke brake for the purposes of mechanical actuation. The mechanical actuation is carried out from only one side of the disk, preferably the inner side which is able to accommodate more readily the mechanical actuating mechanism. The play of the auxiliary brake (i.e. the spacing of the auxiliary brakeshoe from the disk), the elasticity of the brake disk and the elasticity of the yoke support are so dimensioned that the combined reaction force and compressive force on the directly acting element suffice to bring both the mechanically shifted brakeshoe and the auxiliary brakeshoe into contact with the disk. The result is a simple mechanical-acting system which can be use for emergency, parking and locking brake purposes and which may be operated by the handbrake lever in the region of the driver seat of the vehicle via a bowden line. The auxiliary brakeshoe, which is effective only in the stationary position of the vehicle (except when used for emergency braking) suffers little wear and remains effective practically for the life of the brake. It has been found, moreover, that conventional suspensions of the brake yoke and the disk suffice to provide the necessary elasticity without structural modification either of the housing or disk.

Furthermore, the present invention provides that the wear-compensating means for adjusting the brake play in accordance with wear of the main brake lining can be disposed externally of the hydraulic cylinders as, for example, part of the force-transmitting element. The latter can, therefore, be an extensible body which cooperates with the actuating lever to increase its effective length to compensate for wear of the lining. While reference has been made above to a single auxiliary brakeshoe or pad, it is desirable to provide a plurality of such auxiliary shoes adjacent the main brakeshoe and to dispose the brakeshoes in a common axial plane with the force-transmitting element. The brakeshoes, which are partly received in recesses in the yoke halves, may be cemented, rivetted or threaded therein. In accordance with the principles of my earlier application, even the yoke half on which the mechanical-actuating system is provided, may carry auxiliary brake pads.

The above and other objects, features and advantages of the present invention will become more readily apparent from the following description, reference being made to the accompanying drawing in which.

Figure 1:
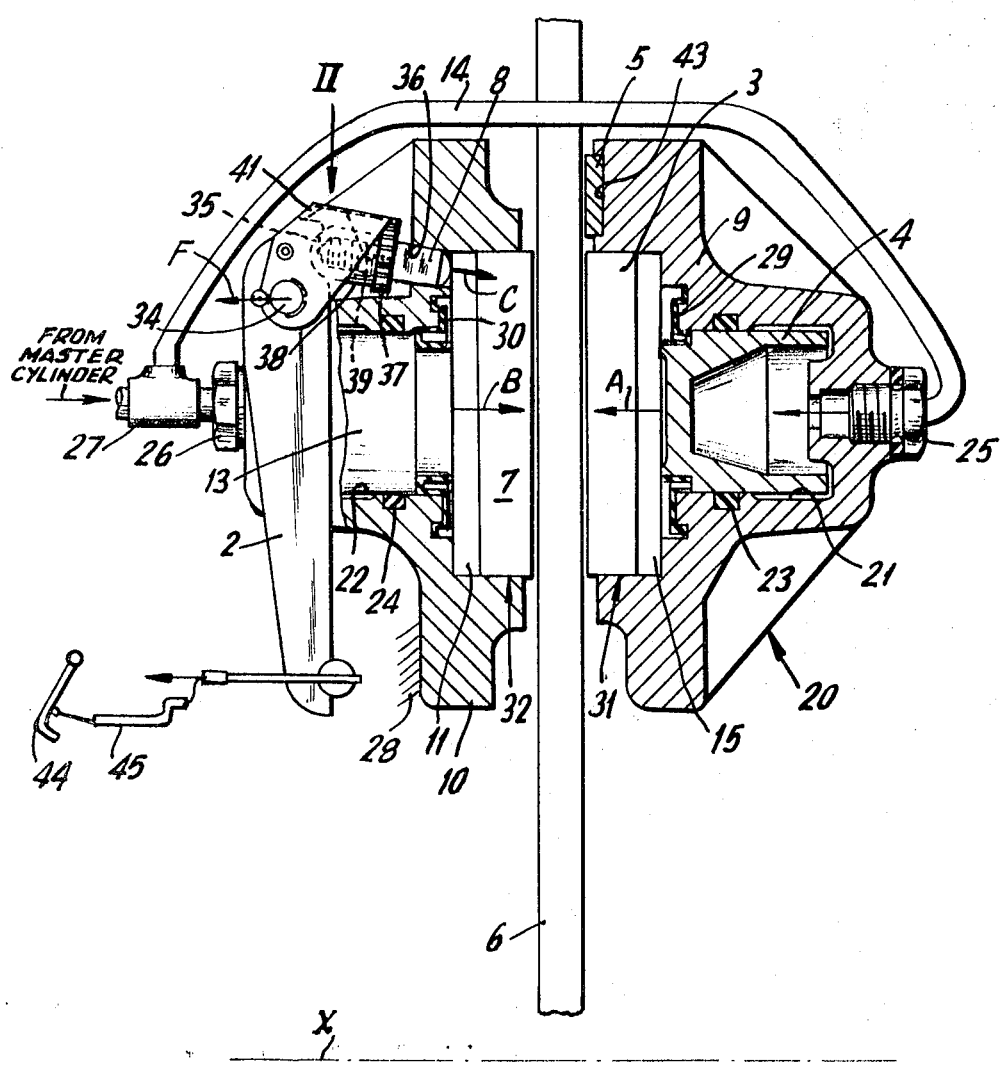
FIG. 1 is an axial cross-sectional view through a disk brake embodying the present invention, some parts being shown diagrammatically.

In the drawing, I show a brake yoke 20 extending around the periphery of the disk 6 whose axis is diagrammatically represented at X. The housing 20 comprises a pair of yoke halves 9 and 10 formed with respective wheel-brake cylinders 21 and 22 whose seals 23 and 24, respectively, slidably engage the wheel-brake pistons 4 and 13. Hydraulic fluid is supplied concurrently to the cylinders 21 and 22 via the ports 25 and 26 which are connected by a hydraulic conduit 14 in communication via fitting 27 with the master cylinder of the vehicle. In the usual manner, the brake disk 6 may be affixed to the tire-carrying wheel disk or to the shaft driving the latter while the yoke 20 is attached to the vehicle chassis or the axle housing as represented at 28 via the inner yoke half 10. The terms "inner" and "outer," as used herein are intended to refer to the vehicle outline as a whole. Thus, the "outer" yoke half 9 will lie closer to the outline of the vehicle body, i.e. on the wheel side of the disk 6, while the yoke half 10 will lie along the "inner" or axle-flange side of the disk. Sleeves 29 and 30 connect the pistons 4, 13 with adjoining walls of the cylinders 21, 22 to prevent entry of contaminants into the wheel-brake cylinder.

Yoke halves 9 and 10 form respective pockets for main brakeshoes 31 and 32 which are shiftable in the direction of arrows A and B toward the respective braking faces 33 and 34 of the disk 6. The brakeshoes 31 and 32 each include a backing plate 15 or 11 against which the pistons 4 and 13 act directly, and a respective brake lining 3 or 7. One of the yoke halves, i.e. the "inner" yoke halve 10, is provided with mechanical brake-actuating means in the form of a lever 2 which is fulcrumed at 34 to the yoke member 20 and acts via an arm 35 upon a force-transmitting element 8 constituted as a bar, rod, pin or stud which is shiftable in the direction of arrow C in a guide channel 36 of the housing 20 toward the disk 6. Element 8 is axially elongatable and is formed with a ratchet wheel 37 carrying an internally threaded sleeve 38 against which the lever 2 acts. A threaded rod 39 is screwed into the sleeve 38 and is retained by its flat 40 or other noncircular means in the bore 36 against rotation. Lever 2 also carries a pawl 41 in the form of a bent spring which steps the ratchet 37 in conventional manner to extend the force-transmitting element 8 for adjustment of the wear of the brake lining.

On the other yoke half 9, flanking the main brakeshoe 31, I provide an auxiliary brake pad 5 analogous to the anvil pads of the previously mentioned copending application. This pad 5 lies in a common axial plane (FIG. 6) with the axis of element 8 and, generally, is coplanar with lever 2. To receive the pad 5, the yoke half 9 can be provided with a recess 43, the pad being force-fitted, rivetted, cemented or threaded into this recess. Lever 2 is operated from a location proximal to the driver's seat of the vehicle via the usual handbrake lever 44 at the dashboard via a bowden cable 45.

Figure 2:
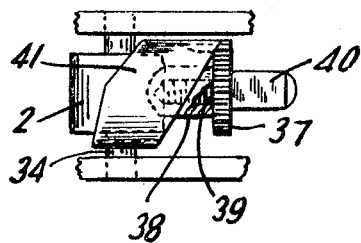
FIG. 2 is a detail view of the fulcrum of the mechanical actuating means thereof taken in the direction of line II of FIG. 1.

For normal brake operation, the system of FIGS. 1 and 2 functions as a conventional disk brake having a fixed yoke. When the brake pedal is depressed, hydraulic fluid is delivered by the master cylinder to the wheel-brake cylinders 21 and 22 and drives the pistons 4 and 13 in the direction of arrows A and B, respectively, to shift the brakeshoes 31 and 32 through the usual brake play on each side of the disk into engagement with the latter. Rotation of the disk is thereby impeded.

When the mechanical brake is to be used as an emergency, locking or parking brake, lever 44 is actuated to swing the lever 2 in a clockwise sense (FIG. 1) and thereby urge element 8 in the direction of arrow C. Element 8 acts upon the brakeshoe 32 at a location on its backing plate 11 offset outwardly from the piston 13 and thus applies this brakeshoe against the disk in the direction of arrow B. The reaction force F at fulcrum 34 is applied to the yoke member 20 and draws the latter in the direction of arrow A, whereupon the auxiliary brakeshoe 5, which evidences little wear in normal use, bears upon the disk 6 to lock the latter to the yoke. Prior to any significant wear of lining 3, this brakeshoe also engages the disk. The reaction force F must overcome the inherent resilience of either the disk 6 or the yoke 20, or both, to displacement from their normal positions and, in accordance with the present invention, such deflection occurs without bodily displacement by inherent distortion of the brake yoke or the means securing same to the wheel and axle flange, respectively. During this period, the mechanical brake functions as if the yoke is axially shiftable akin to a floating-yoke brake. Upon excessive wear of lining 7, the increased stroke of lever 2 will cause the pawl 41 to slide over one or more teeth of the ratchet 37 and engage a tooth of the latter upon its return stroke, thereby extending the element 8 and restoring the original play at the brakeshoe 32.

Figure 3:
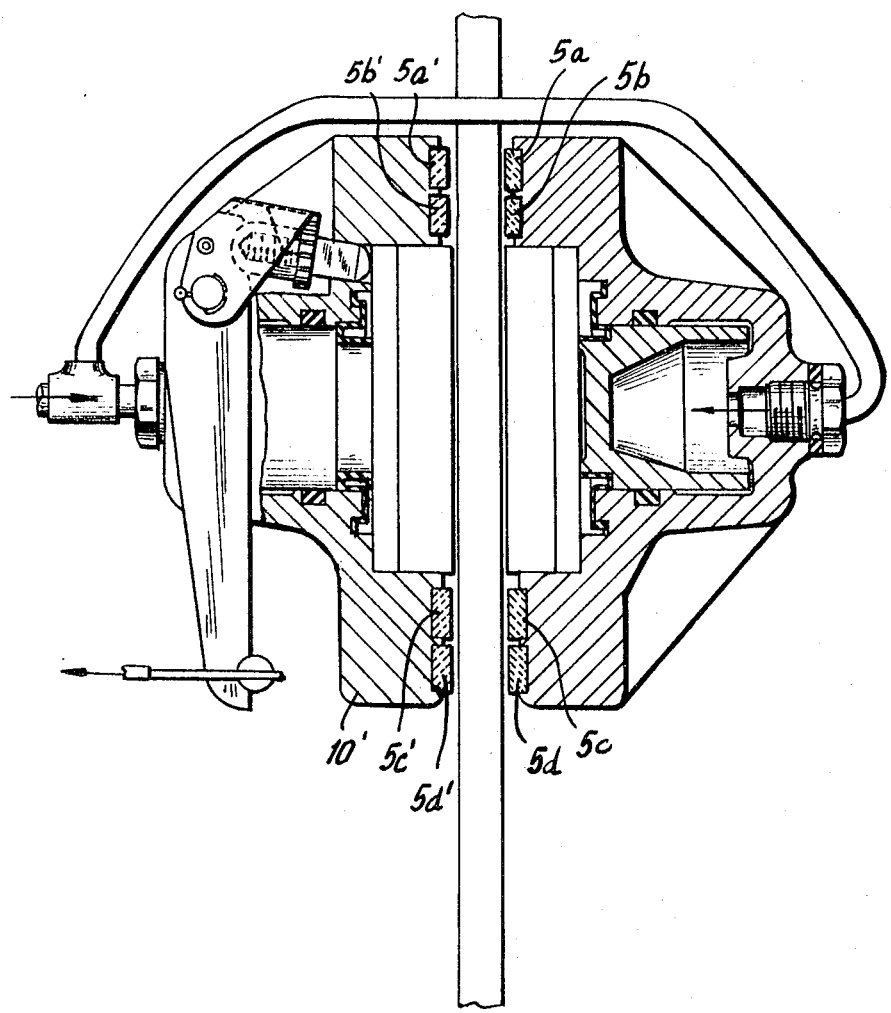
FIG. 3 is a detail view showing another system according to this invention.

In the system of FIG. 3, a plurality of anvil pads is provided on yoke half 9' at 5a, 5b, 5c and 5d, the operation being otherwise similar to that previously described. Corresponding anvil pads can be provided at 5a', 5b', 5c' and 5d' on the yoke half 10' as well so that the apparatus can be used as a dual-network brake with the advantages described in the aforementioned copending application.

I claim:

1. In a fixed-yoke disk brake having a rotatable brake-disk member provided with a pair of annular braking surfaces on opposite faces thereof, a nonrotatable yoke member extending about the periphery of said disk member and having first and second yoke halves flanking the respective surfaces, first and second main brakeshoes mounted in the respective yoke halves and respectively juxtaposed with said braking surfaces for movement relatively to said yoke member toward and away from said disk member, and hydraulic operating means including a pair of hydraulic cylinders respectively formed in said yoke halves and provided with hydraulically displaceable pistons respectively acting upon said main brakeshoes for shifting same, the improvement which comprises mechanical brake-actuating means mounted on one of said yoke halves and operatively coupled with a respective first one of said main brakeshoes for shifting same independently of said hydraulic operating means in the direction of said disk member while applying to said yoke member a reaction force in the opposite direction, and an auxiliary brakeshoe juxtaposed with said disk member and mounted upon the other of said yoke halves adjacent the second main brakeshoe thereof, at least one of said members being mounted with sufficient elasticity to permit deflection thereof to bring said auxiliary brakeshoe into contact with said disk member without bodily movement of said members upon operation of said mechanical actuating means.

2. The improvement defined in claim 1 wherein said main brakeshoe of said one of said yoke halves extends laterally beyond the respective hydraulically displaceable piston, said mechanical brake-actuating means including a linearly shiftable and incompressible force-transmitting element mounted in said one of said yoke halves for movement toward and away from said disk and engaging the respective main brakeshoe at a location offset from the corresponding hydraulically operable piston, and an actuating lever fulcrumed on said one of said yoke halves and bearing upon said element for urging said first main brakeshoe against the disk while applying said reaction force to said disk member.

3. The improvement defined in claim 2 wherein the disk brake is a wheel brake of an automotive vehicle, the disk members being connected to the corresponding vehicle wheel and the yoke member being connected to the vehicle chassis in the region of said wheel with said one of said yoke halves lying inwardly with respect to the outline of said vehicle.

4. The improvement defined in claim 3 wherein said vehicle is provided with handbrake means in the region of the driver seat of said vehicle, said brake further comprising means operatively connecting said handbrake means with said lever.

5. The improvement defined in claim 2 wherein said element and said auxiliary brakeshoe lie in a common axial plane of said disk member.

6. The improvement defined in claim 2, further comprising a plurality of auxiliary brakeshoes mounted on said other yoke half adjacent said second main brakeshoe.

7. The improvement defined in claim 2 wherein said other yoke half is formed with a recess partly receiving said auxiliary brakeshoe.

8. The improvement defined in claim 2 further comprising a second auxiliary brakeshoe on said one of said yoke halves adjacent said first main brakeshoes for engagement with said disk member upon deflection of said disk member into contact therewith.

9. The improvement defined in claim 1 wherein said disk member is mounted with limited freedom of deflection transversely to said surfaces and is drawn by said reaction force into contact with said auxiliary brakeshoe.

10. The improvement defined in claim 1 wherein said brake disk member is resiliently deflectable in a direction transverse to said surfaces and is deflected by said first main brakeshoe into engagement with said auxiliary brakeshoe.

References Cited

UNITED STATES PATENTS 3,342,291 9/1967 Warwick et al. _____ 188—73
3,405,785 10/1968 Schmid.

DUANE A. REGER, Primary Examiner

U.S. Cl. X.R.

188—73, 196